(12) United States Patent
Fujiki et al.

(10) Patent No.: US 7,857,349 B2
(45) Date of Patent: Dec. 28, 2010

(54) SUSPENSION MEMBER

(75) Inventors: Hiroyuki Fujiki, Kanagawa (JP);
Takahiro Watanabe, Kanagawa (JP);
Ryouzou Ikeuchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 473 days.

(21) Appl. No.: 10/571,839

(22) PCT Filed: Oct. 13, 2005

(86) PCT No.: PCT/IB2005/053372

§ 371 (c)(1),
(2), (4) Date: Jul. 9, 2008

(87) PCT Pub. No.: WO2006/040741

PCT Pub. Date: Apr. 20, 2006

(65) Prior Publication Data

US 2008/0258450 A1    Oct. 23, 2008

(30) Foreign Application Priority Data

Oct. 14, 2004 (JP) ............... 2004-300106

(51) Int. Cl.
*B62D 21/11* (2006.01)
(52) U.S. Cl. ............ 280/785; 280/781; 280/124.109; 180/311
(58) Field of Classification Search ............ 180/312, 180/311, 299, 228, 291; 280/781, 784, 785, 280/124.109; 296/205
See application file for complete search history.

(56) References Cited

U.S. PATENT DOCUMENTS

| 5,466,033 | A | | 11/1995 | Murakami et al. |
| 5,573,222 | A | | 11/1996 | Ruehl et al. |
| 6,076,625 | A | * | 6/2000 | Matt et al. ............... 180/312 |
| 6,109,654 | A | * | 8/2000 | Yamamoto et al. ......... 280/784 |
| 6,516,913 | B1 | * | 2/2003 | Hartel et al. ............... 180/312 |
| 6,708,793 | B2 | * | 3/2004 | Witherspoon et al. ....... 180/291 |
| 6,739,624 | B2 | * | 5/2004 | Barber et al. ............. 280/781 |
| 6,843,524 | B2 | * | 1/2005 | Kitagawa ............. 296/187.09 |
| 6,880,663 | B2 | * | 4/2005 | Fujiki et al. ............... 180/232 |
| 6,908,111 | B2 | * | 6/2005 | Takagi et al. ............. 280/781 |

(Continued)

FOREIGN PATENT DOCUMENTS

JP    HEI 05-319308    12/1993

(Continued)

OTHER PUBLICATIONS

PCT International Search Report #PCT/IB2005/053372, dated Jan. 25, 2006.

*Primary Examiner*—Paul N Dickson
*Assistant Examiner*—Drew Brown
(74) *Attorney, Agent, or Firm*—Young Basile

(57) ABSTRACT

A suspension member for connecting a vehicle body and a suspension device that comprises a pair of side members that extend in the longitudinal direction of the vehicle body and are located symmetrically relative to the center in the transverse direction of the vehicle body, and cross members interconnecting the pair of side members and extending in the transverse direction of the vehicle body. The suspension member is formed by press-molding only after flat plate-like side members and cross members are welded in butt joints.

22 Claims, 5 Drawing Sheets

U.S. PATENT DOCUMENTS

| | | | |
|---|---|---|---|
| 7,108,098 B2 * | 9/2006 | Reese et al. | 180/299 |
| 7,520,514 B2 * | 4/2009 | Ogawa et al. | 280/124.109 |
| 7,584,815 B2 * | 9/2009 | Ogawa et al. | 180/312 |
| 2006/0284449 A1 * | 12/2006 | Miyahara | 296/204 |

FOREIGN PATENT DOCUMENTS

| | | |
|---|---|---|
| JP | HEI 07-149254 | 6/1995 |
| JP | HEI 08-169361 | 7/1996 |

* cited by examiner

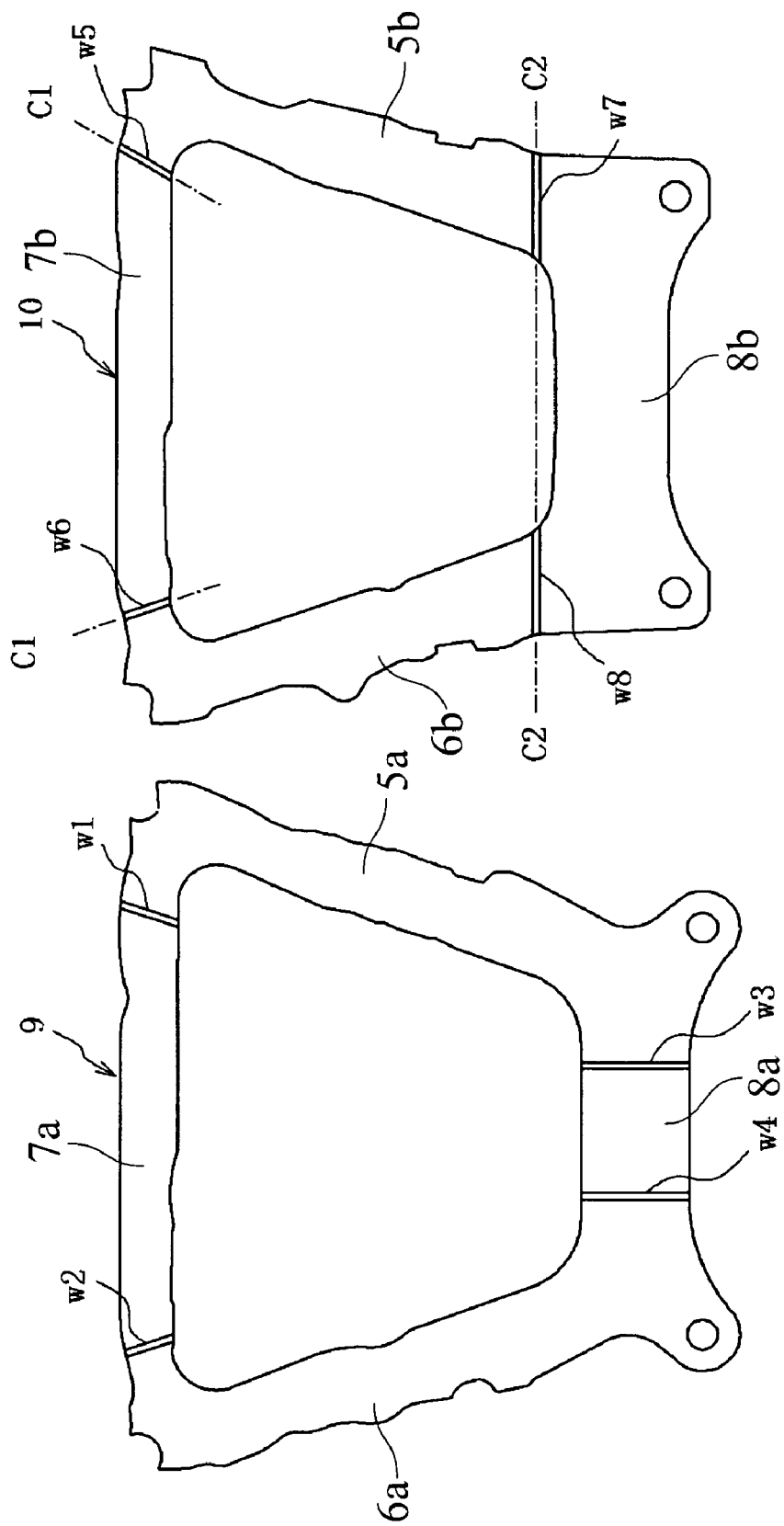

SUSPENSION MEMBER

RELATED APPLICATIONS

The disclosures of Japanese Patent Applications Nos. 2004-300106, filed on Oct. 14, 2004, and 2004-95367, filed on Mar. 29, 2003 (corresponding to U.S. Patent Publication No. 20050115300, Jun. 2, 2005) including specification, drawings and claims, are incorporated herein by reference in their entireties.

FIELD

Disclosed herein is a suspension member for connecting a suspension device to an automotive vehicle body.

BACKGROUND

Generally, the present invention is a suspension member that is intended to be used mainly on the front end of a vehicle to prevent an increase in mass at welded portions.

Specifically, the present invention is a suspension member for connecting a suspension device to a vehicle body that comprises a pair of side members that extend in the longitudinal direction of the vehicle body and are provided symmetrically relative to the center in the transverse direction of the vehicle body, and at least one cross member extending in the transverse direction of the vehicle body and connecting the pair of longitudinal side members at an interval therebetween. Press-molding is carried out thereon after the flat plate-like side members and the cross members are butt-welded, and then the upper panel and lower panel are structured, and finally the upper panel and the lower panel are welded.

Further, in the suspension member, the edges of the longitudinal side members that comprise the upper panel may project towards the inner side of the vehicle body in the transverse direction respectively so as to form a square U-shape that opens to the inner side in the transverse direction of the vehicle body in plan view, and the projected portions may be welded to the cross members that comprise the upper panel in a butt joint.

Presently known suspension members present a problem in that the side members and the cross members that are press-molded in advance are welded together, and therefore these members are overlapped and the entire mass of the suspension member is increased. Nonetheless, in the present suspension member, in order to eliminate the overlapped members, after the flat plate-like side member and the flat plate-like cross members are butt-welded, they are press-molded so as to prepare the upper panel and lower panel.

In addition, in conventional suspension members, the joint portions of the cross member that are press-molded in advance are welded together with the side members that are also press-molded in advance, and stress may concentrate around the welded portions of the cross members relative to the side members. Contrary to this, in the present suspension member the flat plate-like members are butt-welded prior to the press-molding, thereby reducing such a concentration of stress. Consequently, the fatigue strength of the welded portion can be increased and the reliability of the suspension member can be improved.

In addition, where an upper panel has an opening facing downwardly so that the upper panel has an approximately square U-shape in a cross-sectional view, and a lower panel has a flat plate-like shape, the suspension member is deformed in a buckling V-shape downwardly when viewed from the transverse direction of the vehicle body should the vehicle experience a frontal collision. In such a case, the reaction force required during the collision is mainly carried by the side member portions of the side members of the upper panel. Thus, the reaction force borne by the lower panel can be reduced.

Since the rigidity of the upper panel is significant, it is difficult to adopt such a structure because, in the conventional technology, its mass increases as its rigidity is increased. On the other hand, in the present suspension member it is possible to prevent increase of the mass thereof and to adopt such a structure.

Furthermore, when the side members that have been press-molded in advance are welded with the cross members that have been press-molded in advance, a joint portion of the side portion of the side member and an edge of the cross member form a corner of the suspension member, and therefore stress is easily concentrated around the welded portion of the side member and the cross member. In such cases, although the reliability of the suspension member can be improved by increasing the fatigue strength of the welded portion by enlarging the joint portion that is formed at the edge of the cross member, it is not desirable to do so because the weight of the suspension member is increased.

In contrast, the present suspension member may be configured so that the edges of the longitudinal side members that comprise the upper panel project towards the inner side in the transverse direction of the vehicle body, so that the side members have a square U-shape that opens to the inner side in the transverse direction of the vehicle body in plan view, and the edge portions of the longitudinal direction, which projected towards the inner side in the transverse direction of the vehicle body, are butt-welded to the cross members that comprise the upper panel. And thus, the welded portions can be configured by avoiding the corners of the double crossed suspension member. Consequently, the welded portions can be located at portions other than the corners where the stress can be easily concentrated, whereby the reliability of the suspension member can be increased.

The foregoing remarks have outlined rather broadly certain features and technical advantages in order that the following detailed description may be better understood. Additional features and advantages will be described hereinafter.

BRIEF DESCRIPTION OF THE DRAWINGS

For a more complete understanding of the present suspension member, and the advantages thereof, reference is now made to the following description taken in conjunction with the accompanying drawings, in which:

FIGS. 2A and 2B are schematic plan views of an upper panel and lower panel of the suspension member according to an embodiment of the present invention;

DETAILED DESCRIPTION OF THE ILLUSTRATED EMBODIMENTS

A description will now be given, referring to embodiments of the present suspension member. While the claims are not limited to such embodiments, an appreciation of various aspects of the present suspension member is best gained through a discussion of various examples thereof.

Figure 1A:
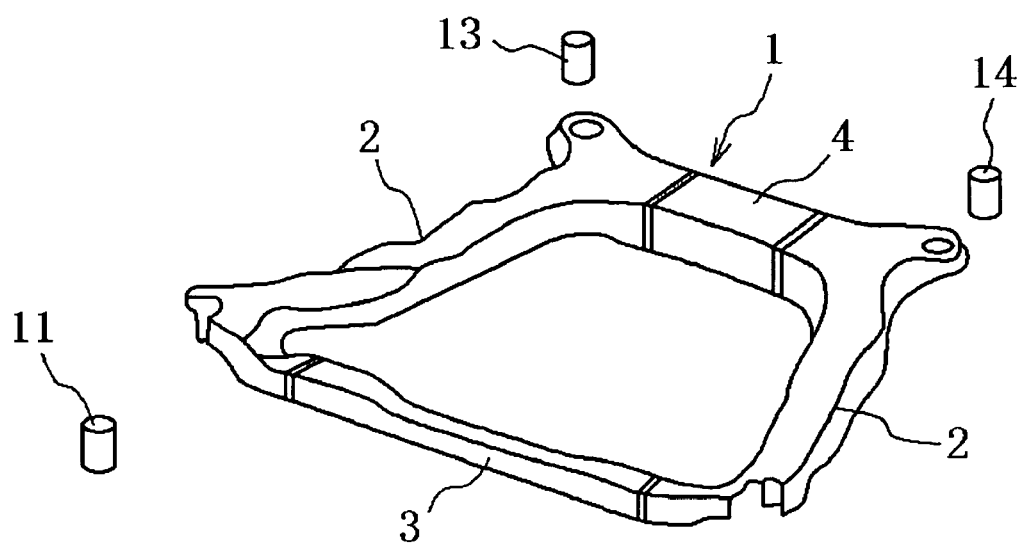
FIGS. 1A and 1B are schematic perspective views of a suspension member according to an embodiment of the present invention.

A suspension member 1 is adapted to connect a vehicle body (not shown) and a suspension device (also not shown) to each other. The suspension member 1 comprises a pair of side members 2 that extend in the longitudinal direction of a vehicle body and that are located symmetrically relative to the center of the vehicle body in the transverse direction. Cross members 3 and 4, which are connected to the pair of side members 2, extend in the transverse direction of the vehicle body and are disposed in the longitudinal direction of the vehicle body at an interval, as shown in FIG. 1A.

Figure 3A:
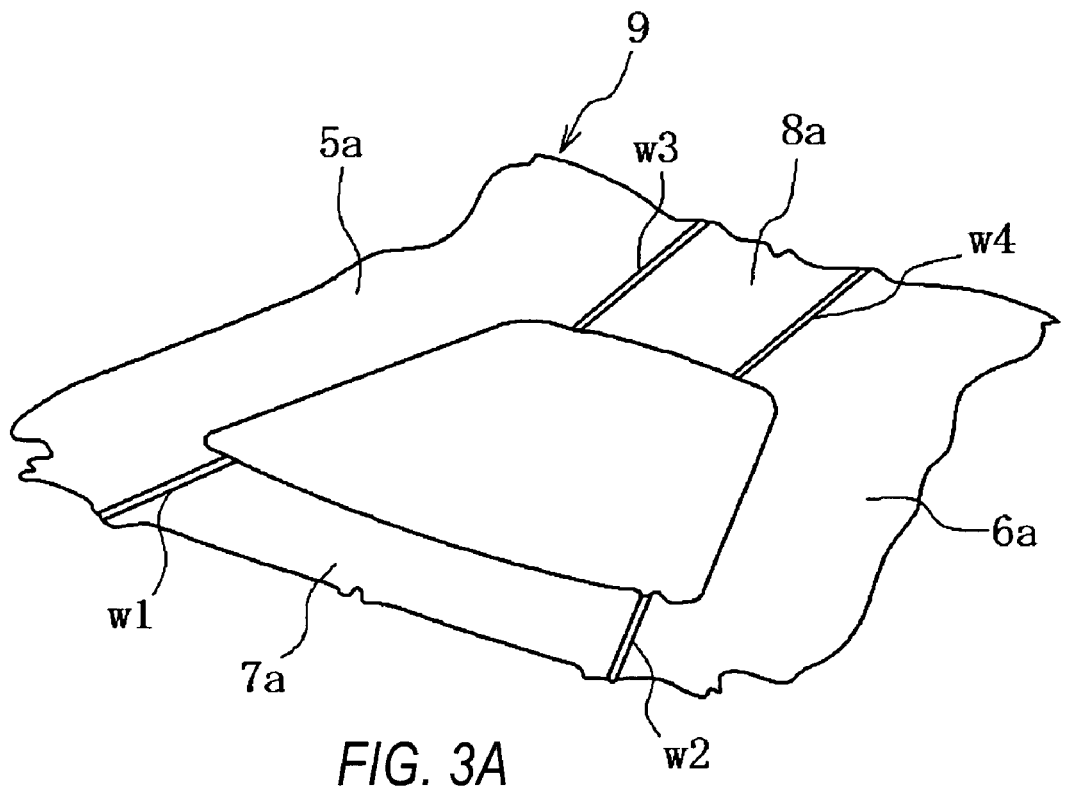
FIGS. 3A and 3B are schematic perspective views of the upper panel and lower panel of the suspension member shown before press-molding according to an embodiment of the present invention.

As shown in FIG. 3A, flat side member plates 5a and 6a have edges in the longitudinal direction of the vehicle body, such that the edges are projected toward the inner side in the transverse direction of the vehicle body. The front side and the rear side of the cross member plates 7a and 8a are butt-welded to the flat side member plates 5a and 6a at the joint portions w1 to w4, as shown in double lines. These plates 5a, 6a, 7a, 8a are press-molded to create an upper panel 9 having a square U-shaped cross section as shown in FIGS. 1B and 2A.

Figure 1B:
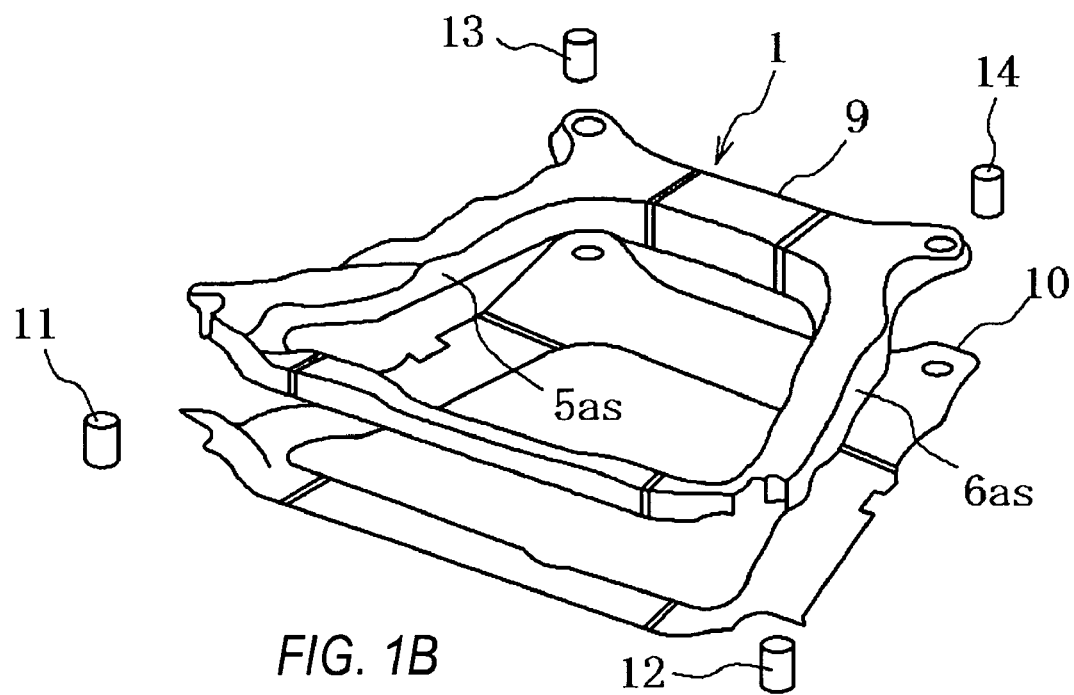
Figure 3B:
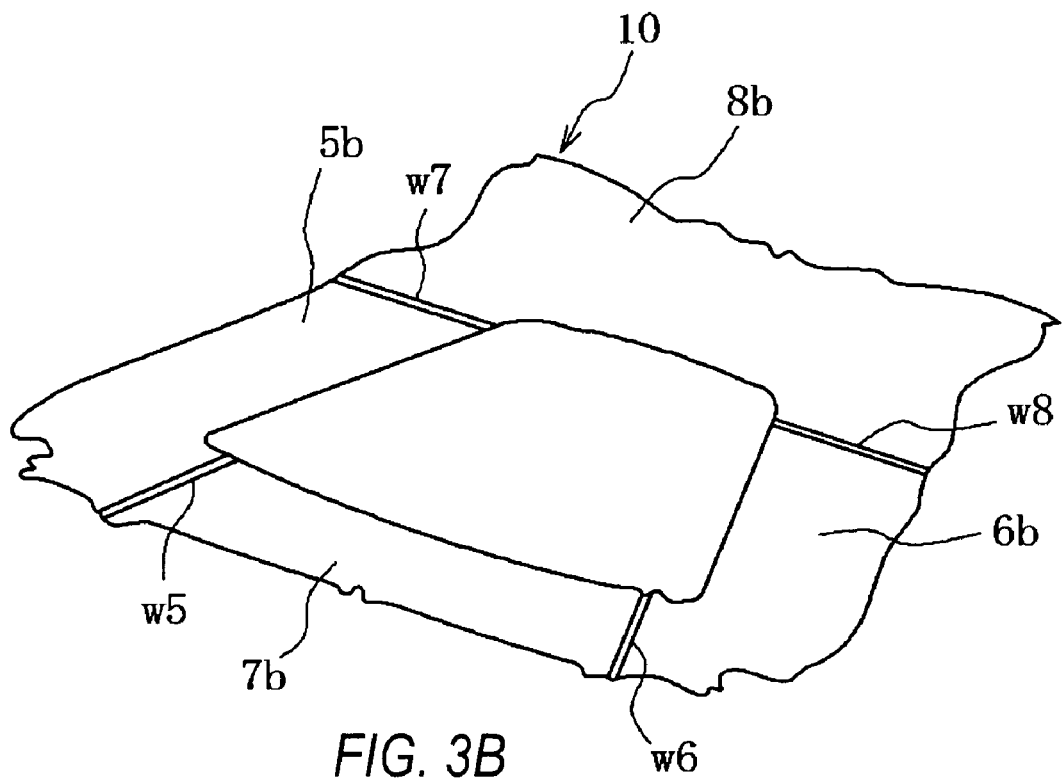

As shown in FIG. 3B, flat side member plates 5b and 6b and the front side and rear side of cross member plates 7b and 8b are butt-welded at the joint portions w5 to w8, as shown in double lines, and then they are press-molded to create a lower panel 10 as shown in FIGS. 1B and 2B. Finally, as shown in FIG. 1B, the upper panel 9 and the lower panel 10 are welded to each other at the inner circumference and outer circumference to form a double cross shape, and then mounts 11, 12, 13 and 14, which are the connecting points to the vehicle body (not shown) in the drawings, are provided at four corners.

The cross member plates 7a and 8a that form the upper panel 9 are thinner than the side member plates 5a and 6a that also form the upper panel 9. In other words, the plate thickness of the cross members 7a and 8a is smaller than the plate thickness of the side members 5a and 6a.

In general, the side members are preferred to have a greater strength in order to control the reaction force during a frontal collision of a vehicle body, the side member plates 5a and 6a are made to be thicker and the cross member plates 7a and 8a are made to be thinner, and the side members 2 and the cross members 3 and 4 are made to have an appropriate and sufficient thickness, respectively, so that excessive weight increase can be limited.

In addition, the upper panel 9 has a square U-shaped cross section that opens downwardly, and the lower panel 10 has a flat plate shape. Here, the cross section is taken along a plane perpendicular to the extending direction of the side member 2 of the upper panel 9 or the cross members 3 and 4.

By using such a structure, the side members 2 will preferably deform in a buckling V-shape downwardly when viewed from a lateral direction of the vehicle body, when the vehicle body experiences a frontal collision. In this case, the reaction force of the collision is primarily carried by the side portions 5as and 6as (FIG. 1B) of the side members 5a and 6a of the upper panel 9 having the square U-shaped cross-section that opens downwardly. Thus, the reaction force borne by the lower panel 10 can be reduced and therefore, the thickness of the lower panel can be reduced and the weight of lower panel 10 can also be reduced.

In addition, as described above, if a vehicle body experiences a collision, the side members 2 are deformed in a buckling V-shape downwardly when viewed from a lateral direction of the vehicle body. In this scenario, a powertrain comprising an engine or a transmission connected to the side members 2 moves downwardly due to the deformation of the side members so that it is possible to prevent the powertrain, having rigidity and large mass, from moving toward an interior of the vehicle body.

Figure 5:
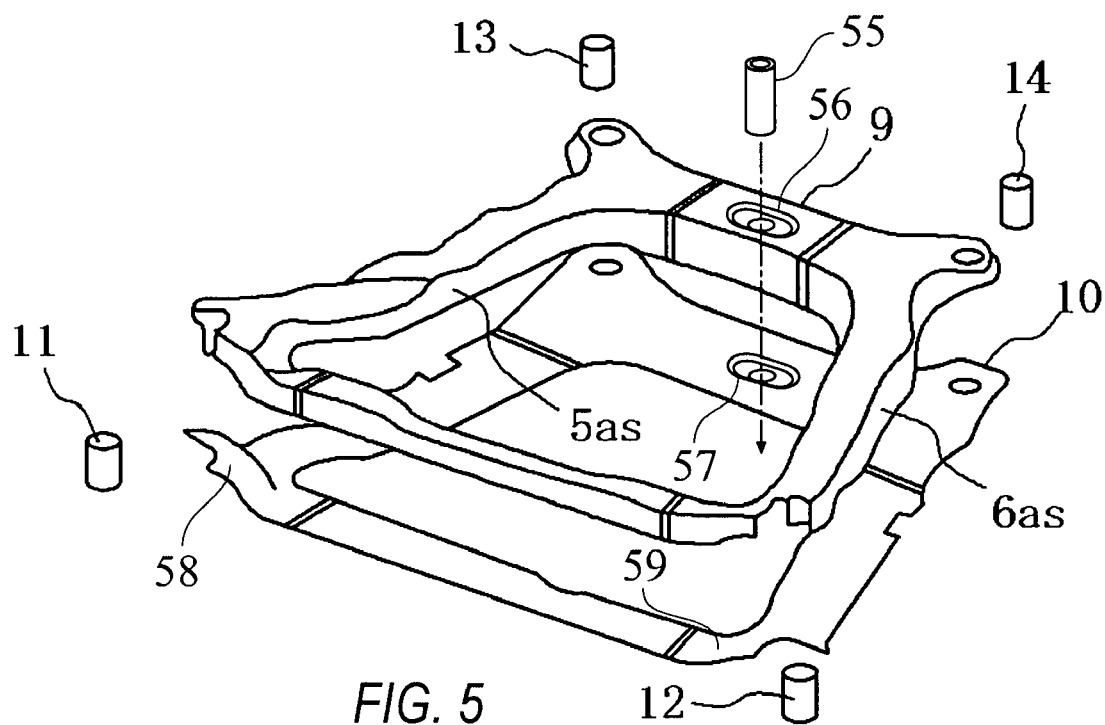
FIG. 5 is a schematic view of a suspension member according to another embodiment of the present invention.

Further, in order to connect the suspension member 1 to a vehicle body side member by bolts and nuts, mounts 11, 12, 13 and 14, and a collar 55 are fixed to the suspension member 1 by adhesive material or by welding. Fixedly connecting portions of these mounts or collar are preferred for enhanced rigidity since the support load is applied thereto. Therefore, as indicated at numerals 56, 57, 58 and 59 in FIG. 5, local concave portions are formed on the fixing portion for the mounts and collar of the upper panel 9 or the lower panel 10 by press-molding, thereby increasing the rigidity of a cross-section formed by the upper panel 9 and the lower panel 10 without increasing the load and further forming a structure capable of bearing the load.

Still further, in the present embodiment, although the concave portions are formed in a top plan thereof, even if the convex portions may be formed on at least one of the upper panel and the lower panel, the same effects can be obtained.

Furthermore, in FIG. 2B, extending directions C1 of the welded portions of lower panel plates on the front side of the vehicle body, shown as double lines, and an extending direction C2 of the welded portion thereof on the rear side of the vehicle body, shown as double lines, which are located between the cross member plates 7b and 8b and side member plates 5b and 6b, are different from each other.

By taking into account that the lower panel 10 bears a small reaction force during a frontal collision of a vehicle body, as shown in FIG. 3B, the welded portions of lower panel flat plates at the rear side of the vehicle body are located in the side members formed by welding the lower panel 10 with the upper panel 9 after carrying out press-molding, so that areas of the side members 5b and 6b can be made smaller than those of the side members 5a and 6a shown in FIG. 3A that form the upper panel 9 after carrying out press-molding. By doing so, the difference in size between the side member plates 5b, 6b and cross member plates 7b, 8b that form the lower panel becomes smaller than that of the side members 5a, 6a and the cross members 7a, 8a that form the upper panel 9. Thereby, when the side member plates 5b and 6b and the cross member plates 7b and 8b are punch processed from a flat plate material, the material yield, namely, the effective usage rate of the material, can be increased.

Although the material for the flat plate is not specifically limited, in general, a steel plate may be used.

Furthermore, when aligning the side member plates 5b and 6b and the cross member plates 7b and 8b shown in FIG. 3B at the welded portions w5 to w8, shown as double lines, before welding, the extending directions C1 and C2 of the welded portions w5 to w8 in the top view of the vehicle body are different as shown in FIG. 2B so that the cross member plates 7b and 8b and the side member plates 5b and 6b can be moved relative to each other in two dimensions in a plane including the longitudinal and transverse directions of the vehicle body, while their edges are butt jointed. Therefore, compared to the case in which the extending direction of the welded portions in the top view of the vehicle body are the same (where each of them is extended in the longitudinal direction of the vehicle body or in the transverse direction of the vehicle body), the precision of the lower panel 10 can be increased and thus have greater tolerances. Therefore, the degree of processing precision that is required during the punching process of the side member plates 5b and 6b and the cross member plates 7b and 8b can be reduced. Consequently, the manufacturing cost can be reduced.

On the other hand, in the upper panel 9 shown in FIG. 3A, the welded portions w1 to w4 of the side member plates 5a and 6a and the cross member plates 7a and 8a are extended approximately in the same longitudinal direction in a plan view of the vehicle body respectively. This is to avoid the welded portion being located on the side members of the upper panel 9, which bear the reaction force during a frontal collision of the vehicle body. Accordingly, the impact of the welded portion on the deformation mode of the upper panel 9 during a frontal collision can be minimized and therefore the desired deformation mode can be easily obtained.

Furthermore, with regard to the cross member plates 7b and 8b and the side member plates 5b and 6b that form the lower panel 10, the extending directions C1 of the welded portions w5 and w6 at the front side of the vehicle body in a plan view of the vehicle body are configured to be in the longitudinal direction of the vehicle body, and the extending directions C2 of the welded portions w7 and w8 at the rear side of the vehicle body in the top view of the vehicle body are configured to be in the transverse direction.

Here, the extended directions in the longitudinal direction of the vehicle body or the transverse direction of the vehicle body are not necessarily required to be precisely parallel.

By taking into account that the thickness of the welded portions w1 to w8 at the butt jointed portions is reduced by a maximum of 20% compared to the base material, so that the strength thereof is also reduced, the welded portions w7 and w8 need not be provided in the rear-side cross member 4, which is formed by welding the lower panel 10 and the upper panel 9, and therefore, the rigidity of the rear-side cross member 4 in the transverse direction of the vehicle body can be increased. Consequently, the grounding transverse rigidity that is required to increase operational stability can be increased.

Figure 4:
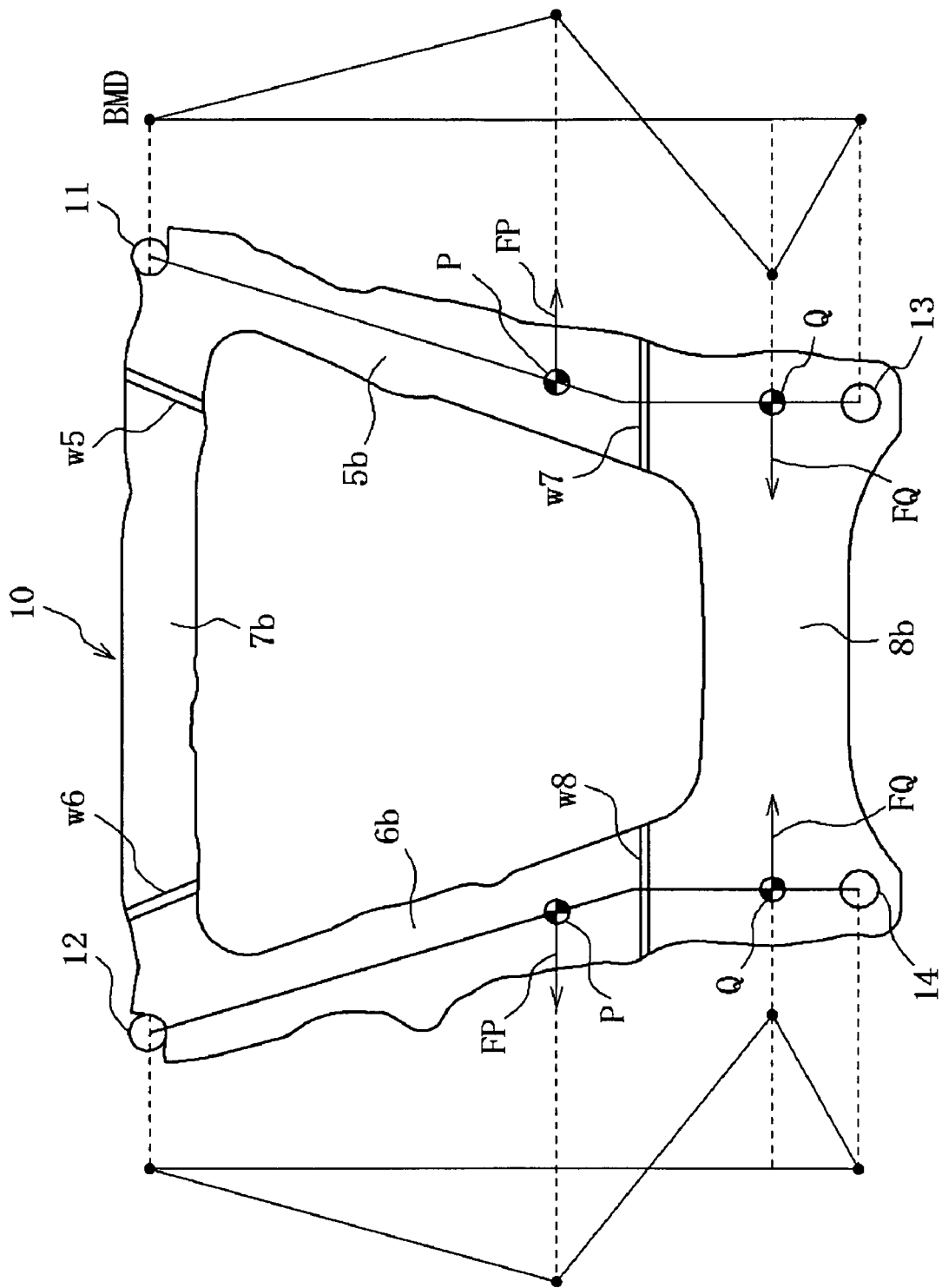
FIG. 4 is a schematic plan view of the suspension member showing positions of the welded portions on the lower panel of the suspension member at the rear end of the vehicle body according to an embodiment of the present invention.

More preferably, as shown in FIG. 4, the welded portions w7 and w8, where the cross member plates 7b and 8b and the side member plates 5b and 6b that form the lower panel are welded at the rear side of the vehicle body, are provided at intermediate portions between front and rear assembly points P and Q where arms that form the suspension device (not shown) are attached to the suspension member.

When a force is applied from the front to the rear of the vehicle body to wheels that are supported by the suspension device (not shown), a force FP from inside to outside in the transverse direction of the vehicle body is applied to the assembly point P of the front of the vehicle body, and a force FQ from outside to inside in the transverse direction of the vehicle body is applied to the assembly point Q. With these forces, the bending moment diagram BMD that is applied to the front to rear portions of the lower panel 10, which become the side members welded to the upper panel 9, is shown in FIG. 4, and the bending moment takes a small value between the assembly point P and the assembly point Q. When a force from the rear side to the front side of the vehicle body is applied to the wheels, the direction of forces and the bending moment are reversed.

In view of the above, by forming the welded portions w7 and w8 in the rear side of the vehicle body as shown in double lines at the portions where the bending moment in the transverse direction of the vehicle body is as small as possible, the stress applied to the welded portions w7 and w8 can be minimized, and consequently, the reliability of the suspension member can be increased.

The present suspension member is not limited to the above-mentioned embodiments, and a variety of modifications or changes can be made.

Although a typical type of welding method used for butt-welding is plasma welding, it is not limited thereto.

In addition, in the above embodiments, although the structure of the suspension member is described, the same effects and operation can be obtained in terms of manufacturing the suspension member.

Figure 6:
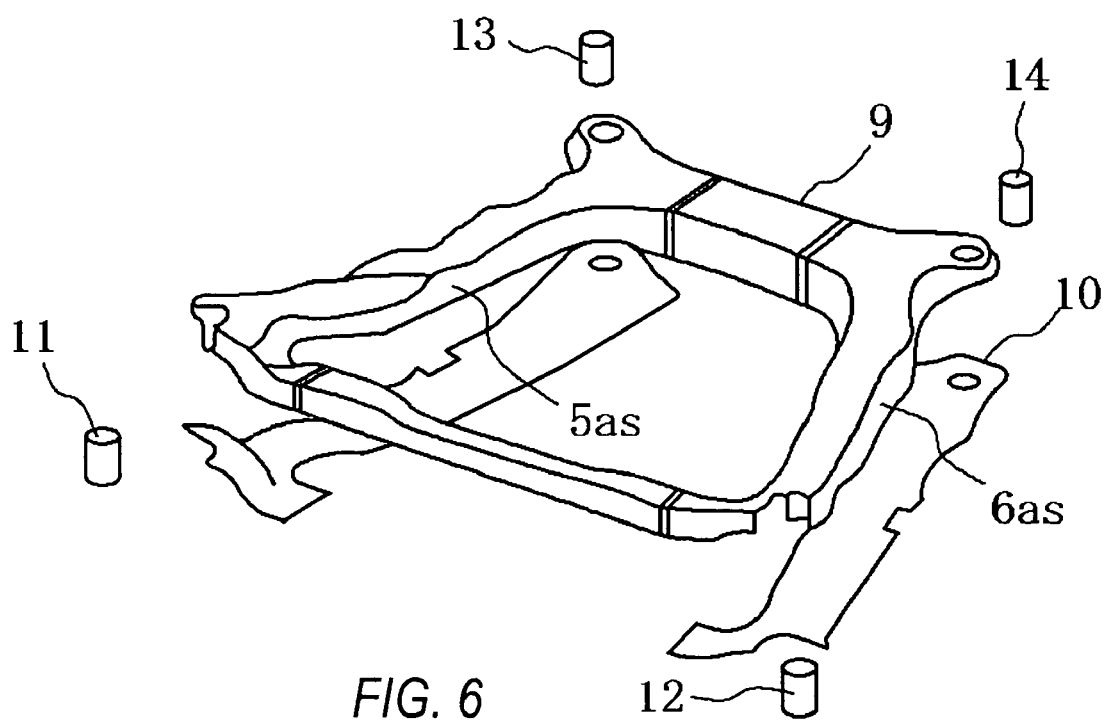
FIG. 6 is a schematic view of suspension member, wherein mounts are shown according to another embodiment of the present invention.

Further, in the above embodiments, although the opening of the upper panel is entirely closed up by the lower panel, it is possible to close up part of the upper panel as show in FIG. 6. In this embodiment, the suspension member has an opening in the rear side.

The present suspension member can be used on a front side or a rear side of a vehicle body, and a greater level of safety against a frontal collision can be obtained. Additionally, the increase in mass is limited and the fatigue strength is increased, thereby improving reliability.

Although only some exemplary embodiments have been described in detail above, those skilled in the art will readily appreciate that many modifications are possible in the exemplary embodiments without materially departing from the novel teachings and advantages. Accordingly, all such modifications are intended to be included within the scope of the claims.

What is claimed is:

1. A suspension member for connecting a suspension device to a vehicle body, comprising:
   a pair of side members extending longitudinally with respect to the vehicle body and positioned symmetrically with respect to a center of the vehicle body in a transverse direction thereof;
   at least one cross member interconnecting said side members and extending transversely with respect to the vehicle body, upper portions of said side members and said at least one cross member being formed from flat plates and welded and then pressed to provide an upper panel having a generally U-shaped cross section open at a lower side thereof; and
   a lower panel affixed to said upper panel and closing said lower side thereof, wherein lower portions of said side members and said at least one cross member are formed from flat plates and welded to provide said lower panel, welds joining the upper portion of said at least one cross member and the upper portions of said side members extending in a first direction, and welds joining the lower portion of said at least one cross member and the lower portions of said side members extending in a second direction different from the first direction.

2. The suspension member according to claim 1, wherein each of the flat plates from which said side members are formed has at least one projection extending inwardly of the suspension member in the transverse direction relative to the vehicle body, and said at least one projection is welded to the flat plate from which said at least one cross member is formed.

3. The suspension member according to claim 1, wherein the thickness of the flat plate from which said at least one cross member is formed is less than the thickness of each of the flat plates from which said side members are formed.

4. The suspension member according to claim 1, wherein at least one of said upper panel and said lower panel is formed with at least one vertically concave or convex portion on an external edge thereof.

5. The suspension member according to claim 1, including at least two of said cross members interconnecting said side members and spaced from each other by an interval in the longitudinal direction of the vehicle body, the lower portions of said side members and said cross members being formed from flat plates and welded to provide said lower panel, the welds joining one of said lower cross-member flat plates to said lower side-member member flat plates extending in the first direction, and the welds joining the other of said lower cross-member flat plates to said lower side-member flat plates extending in the second direction.

6. The suspension member according to claim 5, wherein said first direction is the longitudinal direction of the vehicle body, and the second direction is the transverse direction of the vehicle body.

7. The suspension member according to claim 6, wherein the welds extending in the transverse direction of the vehicle body are intermediate front and rear assembly points of the suspension member at which arms are attachable to the suspension member.

8. The suspension member according to claim 4, wherein each vertically concave or convex portion is fixedly connected to a respective vehicle mount.

9. The suspension member according to claim 1 wherein the at least one cross member comprises two cross members interconnecting said side members and spaced from each other by an interval in the longitudinal direction of the vehicle body.

10. The suspension member according to claim 1 wherein the welds in the upper panel extending in the first direction and the welds in the lower panel extending in the second direction are disposed rearward with respect to the longitudinal direction of the vehicle body.

11. A method of manufacturing a suspension member for connecting a suspension device to a vehicle body, the method comprising:
    butt-welding two upper side-member flat plates to opposing ends of an upper cross-member flat plate, each of the two upper side-member flat plates having a length longer than a width and the upper cross-member flat plate having a length longer than a width;
    pressing the welded flat plates to provide an upper panel having a generally U-shaped cross section open at a lower side thereof; and
    affixing a lower panel to the upper panel to close the lower side thereof.

12. The method according to claim 11, wherein each of the two upper side-member flat plates includes a projection extending transversely with respect to the length of the respective upper side-member flat plate, and said butt-welding step is carried out by butt-welding each of said projections to the upper cross-member flat plate.

13. The method according to claim 12, wherein a thickness of the upper cross-member flat plate is less than a thickness of each of the two upper side-member flat plates.

14. The method according to claim 11, wherein a thickness of the upper cross-member flat plate is less than a thickness of each of the two upper side-member flat plates.

15. The method according to claim 11, further comprising:
    forming a vertically concave or convex portion in at least one of the upper panel and the lower panel on an external edge thereof.

16. The method according to claim 11, further comprising:
    butt-welding the two upper side-member flat plates to opposing ends of a second upper cross-member flat plate before pressing the welded flat plates to provide the upper panel, the second upper cross-member flat plate having a length longer than a width, and the upper cross-member flat plate and second upper cross-member flat plate spaced apart along the length of the two upper side-member flat plates; and
    butt-welding two lower side-member flat plates to opposing ends of two lower cross-member flat plates to provide said lower panel before affixing said lower panel to said upper panel, welds joining one of said two lower cross-member flat plates to said two lower side-member flat plates extending in a first direction, and welds joining the other of said two lower cross-member flat plates to said two lower side-member flat plates extending in a second direction.

17. The method according to claim 16, wherein said first direction is a longitudinal direction of the vehicle body, and the second direction is a transverse direction of the vehicle body.

18. The method according to claim 17, wherein the welds extending in the transverse direction of the vehicle body are intermediate front and rear assembly points of the suspension member at which arms are attachable to the suspension member.

19. The method according to claim 11, wherein welds joining the two upper side-member flat plates to the opposing ends of the cross-member flat plate extend in a first direction, the method further comprising:
    butt-welding two lower side-member flat plates to opposing ends of a lower cross-member flat plate to provide said lower panel before affixing the lower panel to the upper panel, welds joining said two lower side-member flat plates to said lower cross-member flat plate extending in a second direction different from the first direction.

20. The method according to claim 19, further comprising:
    butt-welding the two upper side-member flat plates to opposing ends of a second upper cross-member flat plate before pressing the welded flat plates to provide the upper panel, the second upper cross-member flat plate spaced apart from the upper cross-member flat plate in a longitudinal direction of the vehicle body; and
    butt-welding two lower side-member flat plates to opposing ends of two lower cross-member flat plates to provide said lower panel before affixing said lower panel to said upper panel, the two lower cross-member flat plates spaced apart from each other in the longitudinal direction of the vehicle body.

21. The method according to claim 19 wherein the welds in the upper panel extending in the first direction and the welds in the lower panel extending in the second direction are disposed rearward with respect to the longitudinal direction of the vehicle body.

22. A suspension member for connecting a suspension device to a vehicle body, comprising:
    a pair of side members extending longitudinally with respect to the vehicle body and positioned symmetrically with respect to a center of the vehicle body in a transverse direction thereof;
    at least one cross member interconnecting said side members and extending transversely with respect to the vehicle body, upper portions of said side members and said at least one cross member being formed from flat plates and welded and then pressed to provide an upper panel having a generally U-shaped cross section open at a lower side thereof; and a lower panel affixed to said upper panel and closing said lower side thereof, wherein at least two of said cross members interconnect said side members and are spaced from each other by an interval in the longitudinal direction of the vehicle body, lower portions of said side members and said cross members are formed from flat plates and welded to provide said lower panel, the welds joining one of said lower cross-member flat plates to said lower side-member member flat plates extending in a first direction relative to the vehicle body, and the welds joining the other of said lower cross-member flat plates to said lower side-member flat plates extending in a second direction relative to the vehicle body.

* * * * *